US010067603B1

(12) United States Patent
Hsieh et al.

(10) Patent No.: US 10,067,603 B1
(45) Date of Patent: Sep. 4, 2018

(54) TOUCH PANEL AND SENSING METHOD OF TOUCH PANEL CAPABLE OF SIMULTANEOUSLY ACTIVATING COLUMNS OF SENSORS WITHIN ONE DRIVE CYCLE

(71) Applicant: HIMAX TECHNOLOGIES LIMITED, Tainan (TW)

(72) Inventors: Chi-Hsuan Hsieh, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 20 days.

(21) Appl. No.: 15/586,253

(22) Filed: May 3, 2017

(51) Int. Cl.
*G06F 3/041* (2006.01)

(52) U.S. Cl.
CPC .................................. *G06F 3/0416* (2013.01)

(58) Field of Classification Search
None
See application file for complete search history.

(56) References Cited

U.S. PATENT DOCUMENTS

| 6,452,514 | B1* | 9/2002 | Philipp | G01D 5/2405 |
| | | | | 178/18.06 |
| 9,153,629 | B2* | 10/2015 | Lee | H01L 27/323 |
| 9,547,396 | B2* | 1/2017 | Wang | G06F 3/044 |
| 9,606,606 | B2* | 3/2017 | Kitchens, II | G06F 1/3215 |
| 9,658,718 | B2* | 5/2017 | Choi | G06F 3/0418 |
| 9,665,226 | B2* | 5/2017 | Hu | G06F 3/044 |
| 9,678,614 | B2* | 6/2017 | Xu | G06F 3/044 |
| 9,715,304 | B2* | 7/2017 | Berget | G06F 3/044 |
| 9,740,349 | B2* | 8/2017 | He | G06F 3/044 |
| 9,886,141 | B2* | 2/2018 | Yousefpor | G06F 3/044 |
| 9,939,940 | B2* | 4/2018 | Huang | G06F 3/0412 |
| 9,946,380 | B2* | 4/2018 | Li | G01R 31/02 |
| 9,996,175 | B2* | 6/2018 | Hotelling | G06F 1/3218 |
| 10,013,086 | B2* | 7/2018 | Yang | G02F 1/13338 |
| 2009/0096757 | A1* | 4/2009 | Hotelling | G06F 3/0416 |
| | | | | 345/173 |
| 2010/0001966 | A1* | 1/2010 | Lii | G06F 3/03547 |
| | | | | 345/173 |
| 2011/0048813 | A1* | 3/2011 | Yilmaz | G06F 3/044 |
| | | | | 178/18.06 |

(Continued)

FOREIGN PATENT DOCUMENTS

TW 201335825 A1 9/2013
TW 201346687 A 11/2013

*Primary Examiner* — Chad Dicke
(74) *Attorney, Agent, or Firm* — Winston Hsu

(57) ABSTRACT

A sensing method of a touch panel is provided. The touch panel includes N control lines, M groups of sense lines and a touch sensor array having a plurality of sensors arranged in M rows and N columns. The N control lines are coupled to N columns of sensors. The M groups of sense lines are coupled to M rows of sensors. The sensing method includes the following steps: alternately driving the N control lines to alternately enable the N columns of sensors to detect a touch event, wherein P control lines are driven at a time such that P sensors within each of the M rows of sensors are enabled simultaneously, and P is a positive integer greater than one; and receiving P sensing results generated by the enabled P sensors through a corresponding group of sense lines, and generating a sensing output according to the P sensing results.

6 Claims, 6 Drawing Sheets

(56) References Cited

U.S. PATENT DOCUMENTS

| | | | | |
|---|---|---|---|---|
| 2011/0254778 A1* | 10/2011 | Wang | G06F 3/041 | 345/173 |
| 2012/0013568 A1* | 1/2012 | Hung | G06F 3/044 | 345/174 |
| 2012/0044444 A1* | 2/2012 | Park | H01L 27/14623 | 349/106 |
| 2012/0056835 A1* | 3/2012 | Choo | G06F 3/0412 | 345/173 |
| 2012/0256642 A1* | 10/2012 | Badaye | G06F 3/044 | 324/658 |
| 2013/0033439 A1* | 2/2013 | Kim | G02F 1/13338 | 345/173 |
| 2013/0265256 A1* | 10/2013 | Nathan | G06F 3/0414 | 345/173 |
| 2013/0300695 A1* | 11/2013 | Cho | G06F 3/041 | 345/173 |
| 2013/0314373 A1* | 11/2013 | Kim | G06F 3/044 | 345/174 |
| 2014/0022186 A1* | 1/2014 | Hong | G06F 3/0416 | 345/173 |
| 2014/0118419 A1* | 5/2014 | Wu | G06F 3/0412 | 345/690 |
| 2014/0189579 A1* | 7/2014 | Rimon | G06F 3/0485 | 715/784 |
| 2014/0362033 A1* | 12/2014 | Mo | G06F 3/0416 | 345/174 |
| 2014/0362035 A1* | 12/2014 | Mo | G06F 3/044 | 345/174 |
| 2015/0042601 A1* | 2/2015 | Lee, II | G06F 3/044 | 345/174 |
| 2015/0070314 A1* | 3/2015 | Noguchi | G06F 3/0416 | 345/174 |
| 2015/0116261 A1* | 4/2015 | Ahn | G06F 3/0418 | 345/174 |
| 2015/0160762 A1* | 6/2015 | Hu | G06F 3/044 | 345/174 |
| 2015/0169121 A1* | 6/2015 | Yao | G06F 3/0412 | 345/174 |
| 2015/0324031 A1* | 11/2015 | Jeon | G06F 3/044 | 345/174 |
| 2015/0372028 A1* | 12/2015 | Lee | G06F 3/0412 | 438/50 |
| 2015/0378486 A1* | 12/2015 | Yu | G06F 3/0412 | 345/174 |
| 2016/0170531 A1* | 6/2016 | Lee | G06F 3/044 | 345/174 |
| 2016/0188040 A1* | 6/2016 | Shin | G06F 3/047 | 345/174 |
| 2016/0328075 A1 | 11/2016 | Luo | | |
| 2016/0334916 A1* | 11/2016 | Huang | G02F 1/13338 | |
| 2017/0060289 A1* | 3/2017 | Shin | G06F 3/044 | |
| 2017/0083139 A1* | 3/2017 | Kim | G06F 3/044 | |
| 2017/0115769 A1* | 4/2017 | Ding | G06F 3/044 | |
| 2017/0153746 A1* | 6/2017 | Ahn | G06F 3/0412 | |
| 2017/0168629 A1* | 6/2017 | Lai | G06F 3/0416 | |
| 2017/0235414 A1* | 8/2017 | Ding | G06F 3/047 | 345/174 |
| 2017/0255295 A1* | 9/2017 | Tanemura | G06F 3/044 | |
| 2017/0255322 A1* | 9/2017 | Yang | G06F 3/0416 | |
| 2017/0300143 A1* | 10/2017 | Ma | G06F 3/0412 | |
| 2017/0344145 A1* | 11/2017 | Lo | G06F 3/044 | |
| 2017/0344166 A1* | 11/2017 | Nam | G06F 3/0416 | |
| 2017/0364185 A1* | 12/2017 | Myren | G06F 3/0412 | |
| 2018/0024678 A1* | 1/2018 | Nitobe | G06F 3/0418 | 345/174 |
| 2018/0059831 A1* | 3/2018 | Weng | G06F 3/0412 | |
| 2018/0061898 A1* | 3/2018 | Oh | H01L 27/322 | |

* cited by examiner

TOUCH PANEL AND SENSING METHOD OF TOUCH PANEL CAPABLE OF SIMULTANEOUSLY ACTIVATING COLUMNS OF SENSORS WITHIN ONE DRIVE CYCLE

BACKGROUND OF THE INVENTION

1. Field of the Invention

The disclosed embodiments of the present invention relate to touch panel sensing mechanism, and more particularly, to a sensing method of a touch panel, which detects a touch event by simultaneously activating columns of sensors within a touch sensor array in one drive cycle, and related touch panel.

2. Description of the Prior Art

A conventional touch panel utilizes a touch sensor array to detect a touch event on the touch panel. However, once a distance between a finger and the touch sensor array increases, the magnitude of an electric field induced between the finger and the touch sensor array decreases, thus reducing a signal-to-noise (SNR) of the touch sensor array. For example, when wearing a glove to operate the touch panel, the user will notice a significant decrease in touch sensitivity.

Thus, there is a need for a novel touch panel sensing mechanism to provide good SNRs in various operational environments.

SUMMARY OF THE INVENTION

In accordance with exemplary embodiments of the present invention, a sensing method of a touch panel, which detects a touch event by simultaneously activating columns of sensors within a touch sensor array in one drive cycle, and related touch panel are proposed to solve the above-mentioned problems.

According to an embodiment of the present invention, an exemplary sensing method of a touch panel is disclosed. The touch panel comprises a touch sensor array, N control lines and M groups of sense lines. The touch sensor array comprises a plurality of sensors arranged in M rows and N columns. The N control lines are coupled to N columns of sensors respectively, and the M groups of sense lines are coupled to M rows of sensors respectively. Each of M and N is a positive integer greater than one. The exemplary sensing method comprises the following steps: alternately driving the N control lines to alternately enable the N columns of sensors to detect a touch event on the touch panel, wherein P control lines are driven at a time such that P sensors within each of the M rows of sensors are enabled simultaneously, and P is a positive integer greater than one and less than N; and regarding each of the M rows of sensors, receiving P sensing results generated by the simultaneously enabled P sensors in response to the touch event through a group of sense lines coupled to the row of sensors, and generating a sensing output corresponding to the row of sensors according to the P sensing results.

According to an embodiment of the present invention, an exemplary touch panel is disclosed. The exemplary touch panel comprises a touch sensor array, N control lines, M groups of sense lines, a control circuit and a sensing circuit. The touch sensor array comprises a plurality of sensors arranged in M rows and N columns, and is arranged for detecting a touch event on the touch panel, wherein each of M and N is a positive integer greater than one. The N control lines are coupled to N columns of sensors respectively. The M groups of sense lines are coupled to M rows of sensors respectively. The control circuit is coupled to the N control lines, and is arranged for alternately driving the N control lines to alternately enable the N columns of sensors to detect the touch event, wherein the control circuit drives P control lines at a time such that P sensors within each of the M rows of sensors are enabled simultaneously, and P is a positive integer greater than one and less than N. The sensing circuit is coupled to the M groups of sense lines, wherein regarding each of the M rows of sensors, the sensing circuit is arranged for receiving P sensing results generated by the simultaneously enabled P sensors in response to the touch event through a group of sense lines coupled to the row of sensors, and generating a sensing output corresponding to the row of sensors according to the P sensing results.

The proposed touch panel sensing mechanism may simultaneously drive/activate more than one column of sensors within a single drive cycle to thereby equivalently expand a size of a touch sensor array and extend a touch sensing range. Hence, a touch panel utilizing the proposed touch panel sensing mechanism may maintain good SNRs in various operational environments.

These and other objectives of the present invention will no doubt become obvious to those of ordinary skill in the art after reading the following detailed description of the preferred embodiment that is illustrated in the various figures and drawings.

DETAILED DESCRIPTION

The proposed touch panel sensing mechanism may simultaneously drive/activate more than one column of sensors within a single drive cycle, and use a plurality of sensing results, generated by a plurality of simultaneously activated sensors within one row of sensors, as a sensing output corresponding to a single sensing point on a touch sensor array. In other words, regarding each row of sensors, a sensing output generated in response to a driving/sensing operation may come from a plurality of sensing results of a plurality of sensors. This means that the proposed touch panel sensing mechanism may equivalently expand a size of the touch sensor array, wherein a sensing output corresponding to a single sensing point may include sensing results of multiple sensors rather than a sensing result of a single sensor. Hence, a good SNR is maintained even if a distance between a touch object (e.g. a finger or a stylus pen) and the touch sensor array increases. A touch panel utilizing the proposed touch panel sensing mechanism may have an extended touch sensing range. Further description is provided below.

Figure 1:
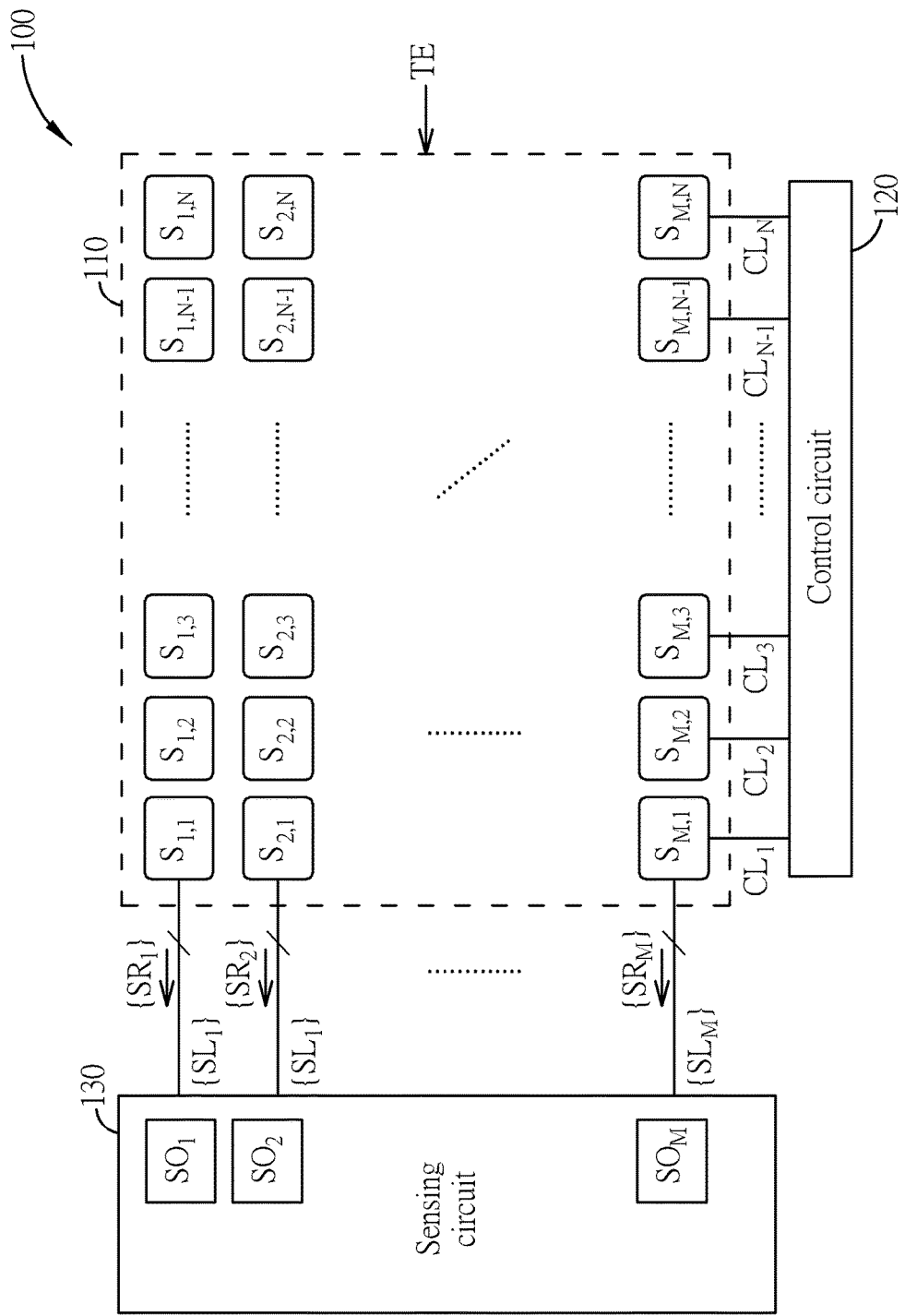
FIG. 1 is a diagram illustrating an exemplary touch panel according to an embodiment of the present invention.

Please refer to FIG. 1, which is a diagram illustrating an exemplary touch panel according to an embodiment of the present invention. The touch panel 100 may include, but is not limited to, a touch sensor array 110, N control lines $CL_1$-$CL_N$, M groups of sense lines $\{SL_1\}$-$\{SL_M\}$, a control circuit 120 and a sensing circuit 130, wherein each of M and N is a positive integer greater than one. In this embodiment, the touch sensor array 110 may include a plurality of sensors $S_{1,1}$-$S_{M,N}$ (e.g. a plurality of capacitive touch sensors) arranged in M rows and N columns, and may be arranged for detecting a touch event TE on the touch panel 100. The N control lines $CL_1$-$CL_N$ are coupled to N columns of sensors within the touch sensor array 110 respectively, wherein M sensors located in a same column are coupled to a same control line. In other words, the sensors $S_1$, $S_2$, ... and $S_{M,1}$ are coupled to the control line $CL_1$, the sensors $S_{1,2}$, $S_{2,2}$, ... and $S_{M,2}$ are coupled to the control line $CL_2$, and so on. In addition, the M groups of sense lines $\{SL_1\}$-$\{SL_M\}$ are coupled to M rows of sensors within the touch sensor array 110 respectively, wherein N sensors located in a same row are coupled to a same group of sense lines. In other words, the sensors $S_{1,1}$, $S_{1,2}$, ... and $S_{1,N}$ are coupled to the group of sense lines $\{SL_1\}$, the sensors $S_{2,1}$, $S_{2,2}$, ... and $S_{2,N}$ are coupled to the group of sense lines $\{SL_2\}$, and so on.

The control circuit 120 is coupled to the N control lines $CL_1$-$CL_N$, and is arranged for driving the N control lines $CL_1$-$CL_N$ to thereby enable/activate the N columns of sensors to detect the touch event TE. In this embodiment, the control circuit 120 may alternately drive the N control lines $CL_1$-$CL_N$ to alternately activate/enable the N columns of sensors to detect the touch event TE, wherein each sensor, when activated/enabled, may detect the touch event TE to generate a sensing result, and the control circuit 120 may drive P control lines (P is a positive integer greater than one and less than N) at a time such that P sensors within each of the M rows of sensors are enabled simultaneously.

Next, the sensing circuit 130 coupled to the M groups of sense lines $\{SL_1\}$-$\{SL_M\}$ may receive P sensing results, generated by the simultaneously enabled P sensors within each row of sensors in response to the touch event TE, through a group of sense lines coupled to the row of sensors, and generate a sensing output corresponding to the row of sensors according to the P sensing results. The sensing circuit 130 may sum up the P sensing results (or perform other calculations, such as weighting calculations, on the P sensing results) and accordingly generate the sensing output.

In this embodiment, the sensing circuit 130 may receive corresponding P sensing results (represented by a group of sensing results $\{SR_1\}$) through the group of sense lines $\{SL_1\}$ and accordingly generate a sensing output $SO_1$, receive corresponding P sensing results (represented by a group of sensing results $\{SR_2\}$) through the group of sense lines $\{SL_2\}$ and accordingly generate a sensing output $SO_2$, and so on. After generating the M sensing outputs $SO_1$-$SO_M$, the sensing circuit 130 may identify the touch event TE (e.g. determining a touch position of a touch object) according to the M sensing outputs $SO_1$-$SO_M$.

In some embodiments, the simultaneously driven P control lines may be adjacent to each other. By way of example but not limitation, the control circuit 120 may refer to a driving sequence to alternately drive the N control lines $CL_1$-$CL_N$, wherein in at least one drive cycle of the driving sequence, the control circuit 120 may drive two adjacent control lines (P=2) at a time to thereby simultaneously enable two adjacent columns of sensors. In one implementation where the control circuit 120 may refer to the driving sequence to drive the control lines $CL_1$ and $CL_2$, the control lines $CL_2$ and $CL_3$, ..., the control lines $CL_{N-1}$ and $CL_N$, and the control lines $CL_N$ and $CL_1$ in sequence, regarding a row of sensors including the sensors $S_{1,1}$, $S_{1,2}$, ... and $S_{1,N}$, the sensors $S_{1,1}$ and $S_{1,2}$ are activated/enabled in a first drive cycle, the sensors $S_{1,2}$ and $S_{1,3}$ are activated/enabled in a second drive cycle next to the first drive cycle, and so on.

In addition, when the sensors $S_1$, and $S_{1,2}$ are activated, the sensing circuit 130 may receive sensing results generated by the sensors $S_{1,1}$ and $S_{1,2}$ in response to the touch event TE (i.e. the group of sensing results $\{SR_1\}$ includes the sensing results generated by the sensors $S_{1,1}$ and $S_{1,2}$) and accordingly generate the sensing output $SO_1$; when the sensors $S_{1,2}$ and $S_{1,3}$ are activated, the sensing circuit 130 may receive sensing results generated by the sensors $S_{1,2}$ and $S_{1,3}$ in response to the touch event TE (i.e. the group of sensing results $\{SR_1\}$ includes the sensing results generated by the sensors $S_{1,2}$ and $S_{1,3}$) and accordingly generate the sensing output $SO_1$. In brief, in response to a driving operation in each drive cycle, the sensing circuit 130 may receive sensing results generated by enabled sensors within the row of sensors, use the received sensing results as the group of sensing results $\{SR_1\}$, and generate the sensing output $SO_1$ according to the group of sensing results $\{SR_1\}$. As the sensing circuit 130 may generate the sensing output $SO_1$ in response to a driving operation in each drive cycle, the sensing output $SO_1$ may be regarded as a sensing output corresponding to a single sensing point activated to detect the touch event TE.

Similarly, each of the sensing outputs $SO_2$-$SO_M$ may be regarded as a sensing output corresponding to a single sensing point activated to detect the touch event TE. It should be noted that, as the sensing circuit 130 may refer to respective sensing results of a plurality of sensors (e.g. adjacent/neighboring sensors) to generate a sensing output, which is used as a sensing output of a single sensing point, the obtained signal intensity associated with the single sensing point increases, thus enhancing the SNR of the touch panel 100.

The above is for illustrative purposes only, and is not meant to be a limitation of the present invention. In an alternative design, the control circuit 120 may only drive one boundary control line (the control line $CL_1/CL_N$) in one drive cycle. For example, in a case where the control circuit 120 refers to a driving sequence to alternately drive the N control lines $CL_1$-$CL_N$, and drives two control lines at a time in at least one drive cycle of the driving sequence, respective control lines driven in a plurality of drive cycles of the driving sequence may be "$CL_1$ and $CL_2$, $CL_2$ and $CL_3$, ... $CL_{N-1}$ and $CL_N$, $CL_N$" or "$CL_1$, $CL_1$ and $CL_2$, $CL_2$ and $CL_3$, ... $CL_{N-1}$ and $CL_N$", wherein the control circuit 120 only drives one boundary control line (the control line $CL_1/CL_N$) in a drive cycle.

In another alternative design, the simultaneously driven control lines may not be adjacent to each other. In yet another alternative design, the control circuit 120 may alternately drive the N control lines $CL_1$-$CL_N$ by driving more than two control lines at a time. In brief, as long as a touch panel sensing mechanism may drive more than one control lines at a time to alternately enable more than one columns of sensors, and refer to respective sensing results generated by enabled sensors within each row of sensors to generate a sensing output, various modifications and alternatives fall within the scope of the prevent invention.

Figure 2:
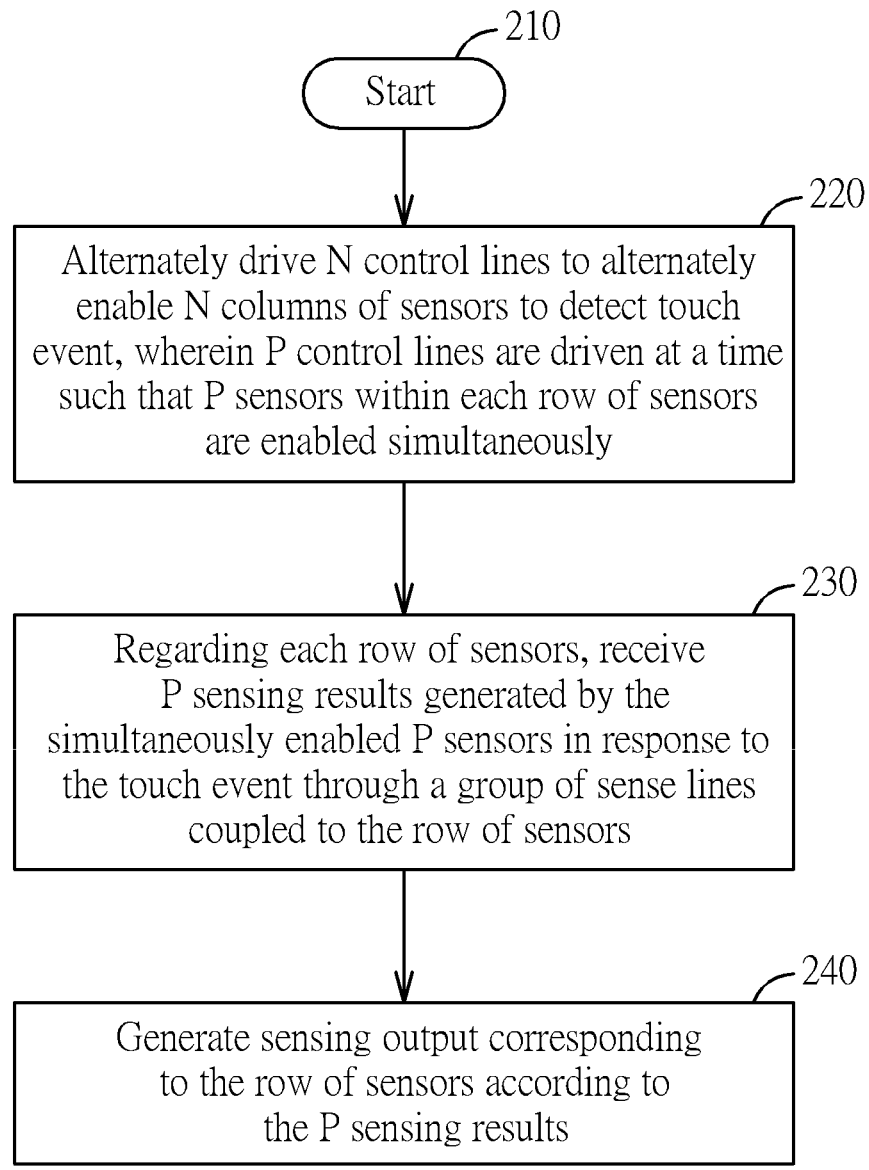
FIG. 2 is a flow chart of an exemplary sensing method of a touch panel according to an embodiment of the present invention

FIG. 2 is a flow chart of an exemplary sensing method of a touch panel according to an embodiment of the present invention, wherein the sensing method may be employed in the touch panel 100 shown in FIG. 1. For illustrative purposes, the sensing method shown in FIG. 2 is described with reference to the touch panel 100 shown in FIG. 1. However, this is not meant to be a limitation of the present invention. The method shown in FIG. 2 may be summarized below.

Step 210: Start.

Step 220: Alternately drive the N control lines $CL_1$-$CL_N$ to alternately enable the N columns of sensors to detect the touch event TE on the touch panel 100, wherein P of the N control lines $CL_1$-$CL_N$ are driven at a time such that P sensors within each of the M rows of sensors are enabled simultaneously, and P is a positive integer greater than one and less than N.

Step 230: Regarding each of the M rows of sensors, receive P sensing results generated by the simultaneously enabled P sensors in response to the touch event TE through a group of sense lines coupled to the row of sensors. For example, the sensing circuit 130 may receive, through the group of sense lines $\{SL_1\}$, respective sensing results generated by the simultaneously enabled P sensors within a row of sensors including the sensors $S_{1,1}$, $S_{1,2}$, ... $S_{1,N}$.

Step 240: Generate a sensing output corresponding to the row of sensors according to the P sensing results.

It should be noted that, in step 220, a portion of P control lines driven in one drive cycle may be identical to a portion of P control lines driven in another drive cycle next to said one drive cycle. By way of example but not limitation, the control circuit 120 may refer to a driving sequence to alternately drive the N control lines $CL_1$-$CL_N$, wherein in a first drive cycle of the driving sequence, the control circuit 120 may simultaneously drive a first control line and (P−1) second control lines included in the N control lines $CL_1$-$CL_N$, and in a second drive cycle of the driving sequence next to the first cycle, the control circuit 120 may simultaneously drive the (P−1) second control lines and a third control line included in the N control lines $CL_1$-$CL_N$, wherein the third control line is different from the first control line.

In one implementation, the first control line may be adjacent to the (P−1) second control lines, and the (P−1) second control lines may be adjacent to the third control line. For example, in a case where the control circuit 120 drives two of the N control lines $CL_1$-$CL_N$ at a time (P=2), the first control line may be the control line $CL_1$, the (P−1) second control lines may be the control line $CL_2$, and the third control line may be the control line $CL_3$. In another implementation, the first control line or the third control line may not be adjacent to the (P−1) second control lines. For example, in a case where the control circuit 120 drives two of the N control lines $CL_1$-$CL_N$ at a time (P=2), the first control line may be the control line $CL_{N-1}$, the (P−1) second control lines may be the control line $CL_N$, and the third control line may be the control line $CL_1$.

As a person skilled in the art can readily understand the operation of each step shown in FIG. 2 after reading the above paragraph directed to FIG. 1, further description is omitted here for brevity.

To facilitate an understanding of the present invention, an exemplary implementation is given in the following for further description of the proposed touch panel sensing mechanism. It should be noted that other circuit implementations employing the architecture shown in FIG. 1 are feasible. Please refer to FIG. 3, which is an implementation of the touch panel 100 shown in FIG. 1. In this implementation, the touch panel 300 may include the touch sensor array 110, the N control lines $CL_1$-$CL_N$ and the M groups of sense lines $\{SL_1\}$-$\{SL_M\}$ shown in FIG. 1, a control circuit 320 and a sensing circuit 330, wherein the control circuit 120 and the sensing circuit 130 shown in FIG. 1 may be implemented by the control circuit 320 and the sensing circuit 330 respectively. Additionally, each of the M groups of sense lines $\{SL_1\}$-$\{SL_M\}$ may include N sense lines respectively coupled to N sensors within a corresponding row of sensors. Specifically, the group of sense lines $\{SL_1\}$ may include N sense lines $SL_{1,1}$-$SL_{1,N}$ respectively coupled to the N sensors $S_{1,1}$-$S_{1,N}$, the group of sense lines $\{SL_2\}$ may include N sense lines $SL_{2,1}$-$SL_{2,N}$ respectively coupled to the N sensors $S_{2,1}$-$S_{2,N}$, and so on.

The control circuit 320 may generate a drive signal SD (e.g. a modulated triangular wave signal or a modulated square wave signal) to P control lines coupled to P columns of sensors (P is a positive integer greater than one and less than N), thereby enabling P sensors within each of the rows of sensors. The sensing circuit 330 may include, but is not limited to, a selection circuit 332 and a processing circuit 334, wherein the selection circuit 332 is coupled between the processing circuit 334 and the M groups of sense lines $\{SL_1\}$-$\{SL_M\}$. Regarding each of the rows of sensors, when the control circuit 320 simultaneously enables the P sensors within the row of sensors to detect the touch event TE, the selection circuit 332 may couple P sense lines coupled to the enabled P sensors to the processing circuit 334 in order to transmit P sensing results generated by the enabled P sensors to the processing circuit 334, and uncouple (N−P) sense lines coupled to unenabled (N−P) sensors from the processing circuit 334. Hence, the processing circuit 334 may receive the P sensing results to generate a corresponding sensing output.

By way of example but not limitation, the selection circuit 332 may include M multiplexer circuits 332_1-332_M (each multiplexer circuit is labeled MUX), which are coupled to the M groups of sense lines $\{SL_1\}$-$\{SL_M\}$ respectively. The processing circuit 334 may include M analog-to-digital converters 334_1-334_M (or Integrating circuits), wherein each analog-to-digital converter is labeled ADC. For example, the MUX 332_1 may couple the group of sensing results $\{SR_1\}$, which is generated by a row of sensors RS1 including the N sensors $S_{1,1}$-$S_{1,N}$, to the ADC 334_1, and the ADC 334_1 may output the sensing output $SO_1$ accordingly.

Figure 3:
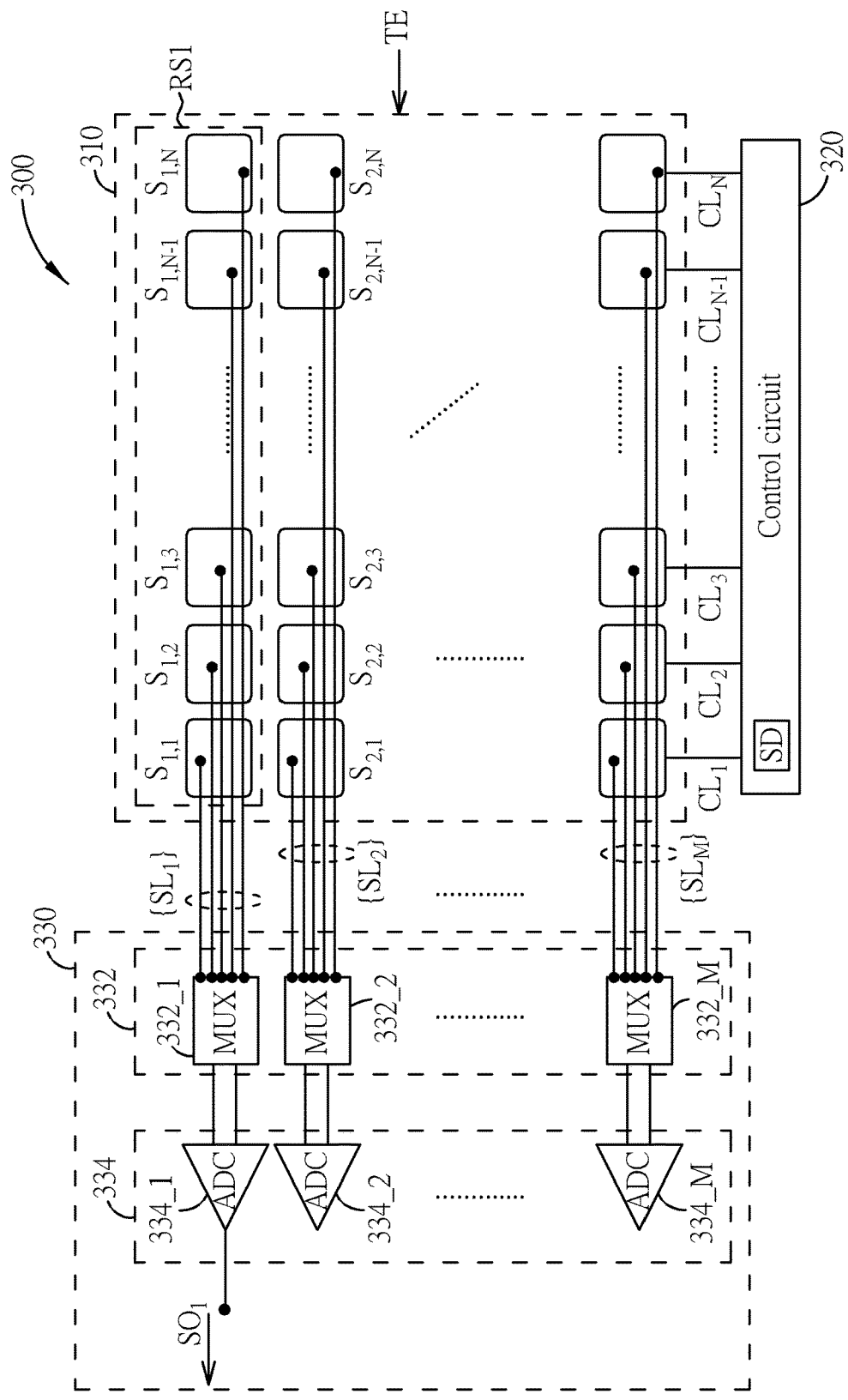
FIG. 3 is an implementation of the touch panel shown in FIG. 1.
Figure 4:
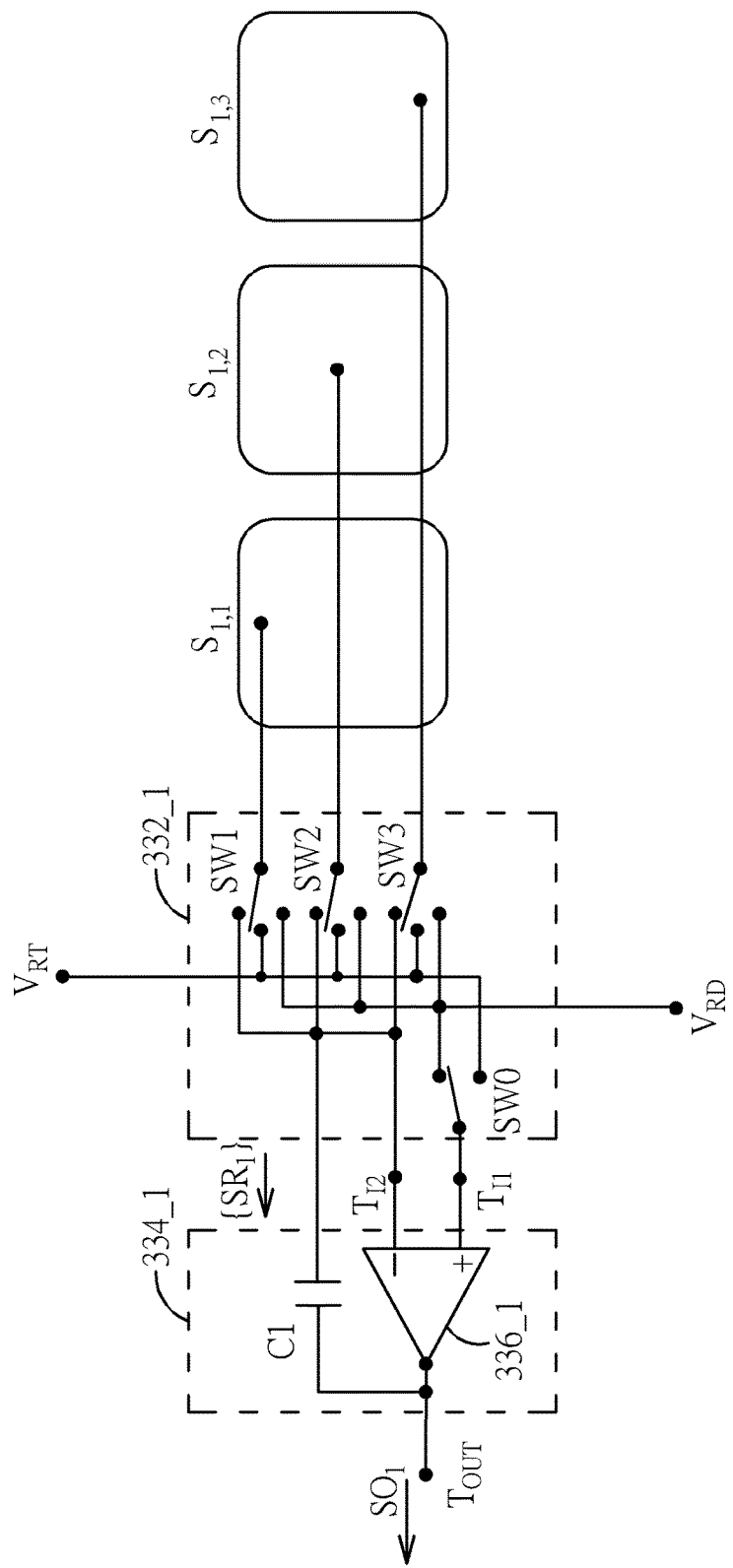
FIG. 4 is a diagram illustrating a portion of circuit structures of the multiplexer circuit and the analog-to-digital converter associated with the row of sensors shown in FIG. 3 according to an embodiment of the present invention.

In some embodiments, the selection circuit 332 may further couple the (N−P) sense lines, which are coupled to the unenabled (N−P) sensors, to a reference signal (not shown in FIG. 3), wherein the reference signal has a waveform identical to a waveform of the drive signal SD. Please refer to FIG. 4 in conjunction with FIG. 3. FIG. 4 is a diagram illustrating a portion of circuit structures of the MUX 332_1 and the ADC 334_1 associated with the row of sensors RS1 shown in FIG. 3 according to an embodiment of the present invention. For the sake of brevity, FIG. 4 only shows circuit elements corresponding to the sensors $S_{1,1}$-$S_{1,3}$ within the row of sensors RS1. It should be noted that a portion or all of other multiplexer circuits 332_2-332_M may employ the circuit structure shown in FIG. 4, and/or a portion or all of other analog-to-digital converters 334_2-334_M may employ the circuit structure shown in FIG. 4.

In the embodiment shown in FIG. 4, the MUX 332_1 may include, but is not limited to, a plurality of switches SW0-

SW3, and the ADC 334_1 may include, but is not limited to, a signal amplifier 336_1 and a capacitor C1, wherein the signal amplifier 336_1 may have an input terminal $T_{I1}$, an input terminal $T_{I2}$ and an output terminal $T_{OUT}$. The switch SW0 may selectively couple the input terminal $T_{I1}$ to one of a reference signal $V_{RT}$ and a reference signal $V_{RD}$, wherein the reference signal $V_{RT}$ has a waveform similar/identical to the waveform of the drive signal SD, and the reference signal $V_{RD}$ may be implemented by a reference voltage (e.g. a constant voltage or a ground voltage). The switch SW1 may selectively couple the sensor $S_{1,1}$ to one of the input terminal $T_{I2}$, the reference signal $V_{RT}$ and the reference signal $V_{RD}$. The switch SW2 may selectively couple the sensor $S_{1,2}$ to one of the input terminal $T_{I2}$, the reference signal $V_{RT}$ and the reference signal $V_{RD}$. The switch SW3 may selectively couple the sensor $S_{1,3}$ to one of the input terminal $T_{I2}$, the reference signal $V_{RT}$ and the reference signal $V_{RD}$. In addition, the capacitor C1 may be coupled between the input terminal $T_{I2}$ and the output terminal $T_{OUT}$.

Regarding each sensor, when the sensor is activated/enabled, a corresponding switch may be coupled between the sensor and the input terminal $T_{I2}$; when the sensor is not activated/enabled, the corresponding switch may be coupled between the sensor and the reference signal $V_{RT}$. Since the waveform of the reference signal $V_{RT}$ is similar/identical to that of the drive signal SD used for driving a control line coupled to a nearby activated sensor, coupling the reference signal $V_{RT}$ to the sensor which is inactivated may reduce signal interference therebetween.

Figure 5:
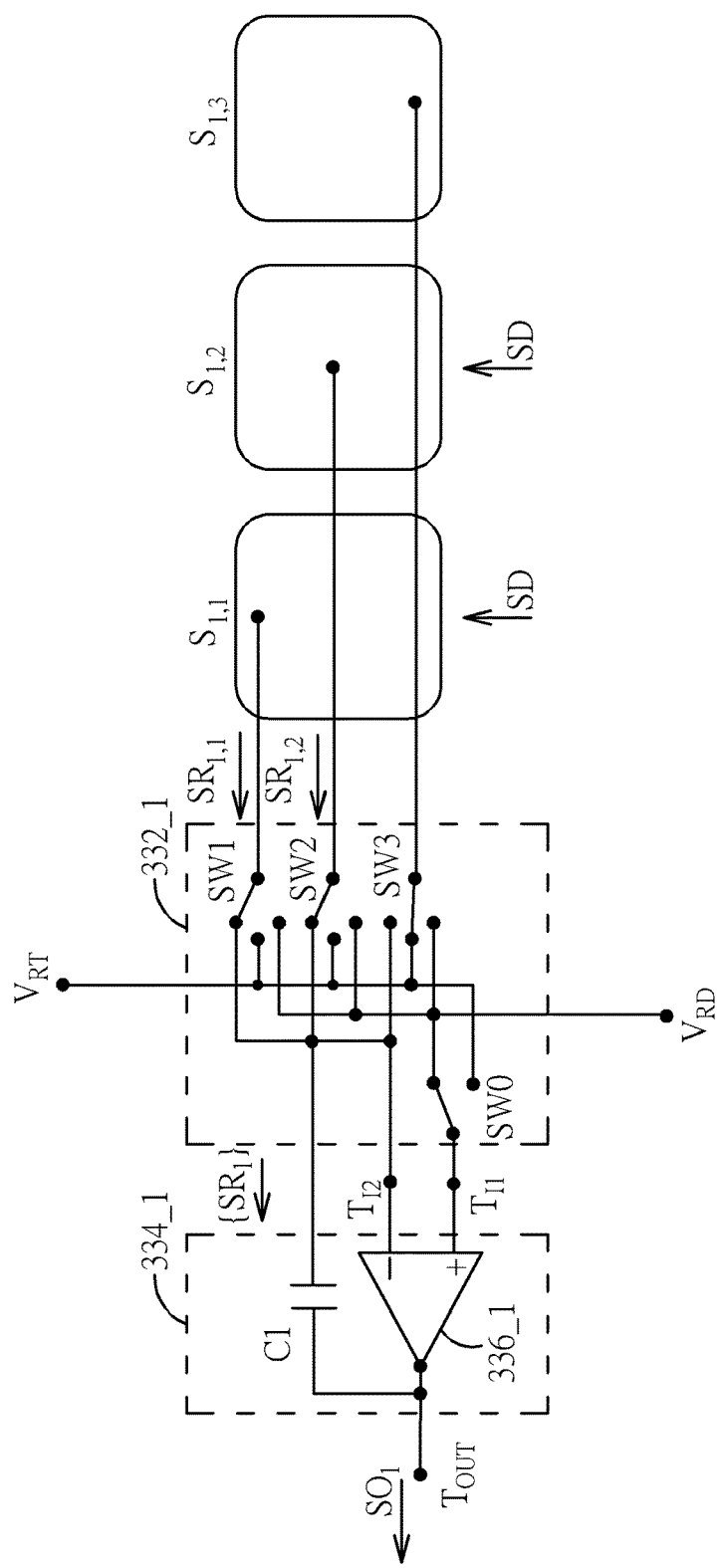
FIG. 5 is a diagram illustrating exemplary operations of the multiplexer circuit and the analog-to-digital converter shown in FIG. 4 in a first drive cycle according to an embodiment of the present invention.
Figure 6:
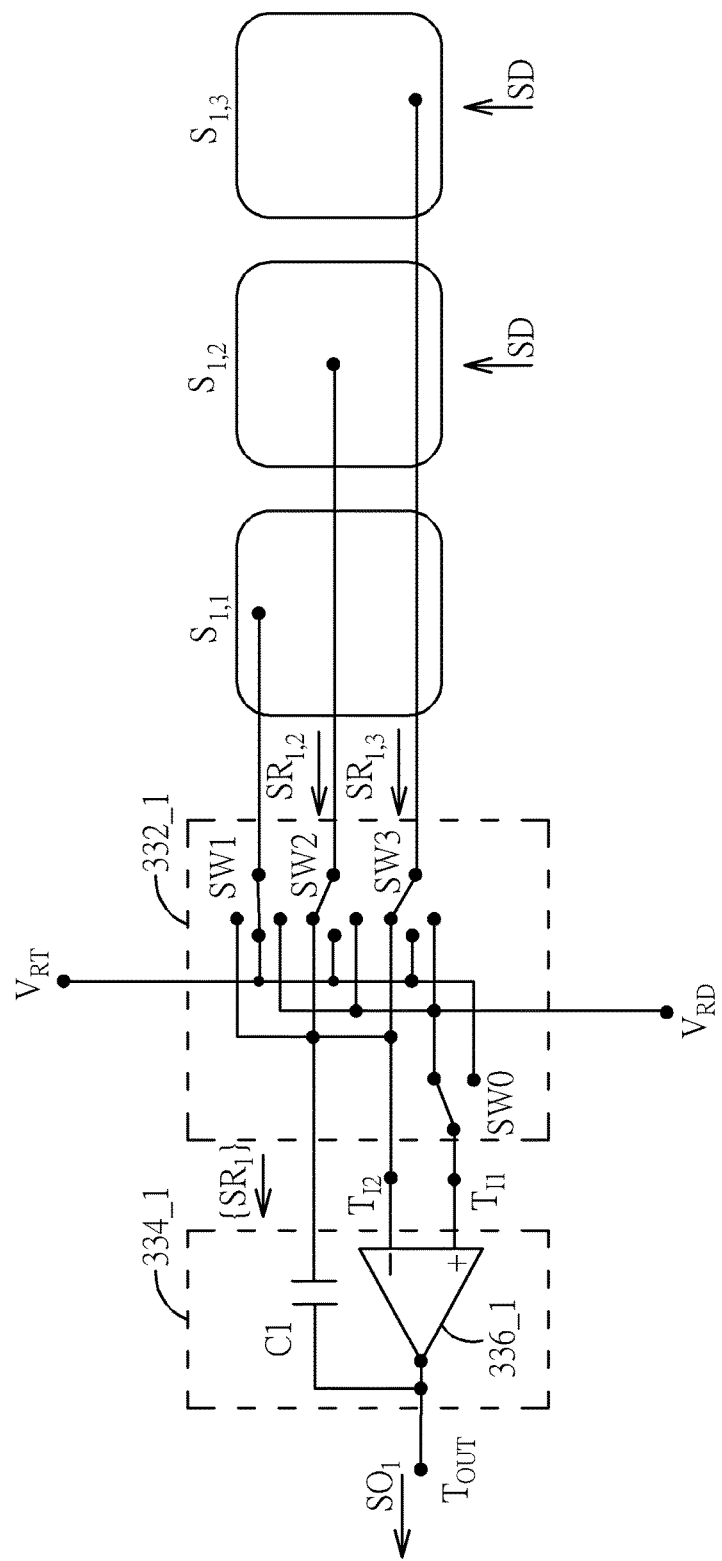
FIG. 6 is a diagram illustrating exemplary operations of the multiplexer circuit and the analog-to-digital converter shown in FIG. 4 in a second drive cycle according to an embodiment of the present invention.

For a better understanding of the present invention, exemplary switching operations of the switches SW0-SW3 shown in FIG. 4 is given in the following implementation where the control circuit 320 refers to a driving sequence to alternately drive the N control lines $CL_1$-$CL_N$, wherein respective control lines driven in a plurality of drive cycles of the driving sequence may be "$CL_1$ and $CL_2$, $CL_2$ and $CL_3$, ... $CL_{N-1}$ and $CL_N$, $CL_N$ and $CL_1$". However, this is for illustrative purposes only, and is not meant to be a limitation of the present invention. Please refer to FIG. 5 and FIG. 6 in conjunction with FIG. 3. FIG. 5 is a diagram illustrating exemplary operations of the MUX 332_1 and the ADC 334_1 shown in FIG. 4 in a first drive cycle according to an embodiment of the present invention, and FIG. 6 is a diagram illustrating exemplary operations of the MUX 332_1 and the ADC 334_1 shown in FIG. 4 in a second drive cycle according to an embodiment of the present invention. The second drive cycle is next to the first drive cycle in the driving sequence.

Firstly, in the first drive cycle, the control circuit 320 may generate the drive signal SD to the control lines $CL_1$ and $CL_2$ so as to enable the sensors $S_{1,1}$ and $S_{1,2}$ to detect the touch event TE. The switch SW0 may couple the input terminal $T_{I1}$ to the reference signal $V_{RD}$ such that the ADC 3341 may perform signal conversion (or signal integration). The switch SW1 may couple the sensor $S_{1,1}$ to the input terminal $T_{I2}$ so as to transmit the sensing result $SR_{1,1}$ to the ADC 334_1. Similarly, the switch SW2 may couple the sensor $S_{1,2}$ to the input terminal $T_{I2}$ so as to transmit the sensing result $SR_{1,2}$ to the ADC 334_1. To reduce noise interference, the switch SW3 may couple the sensor $S_{1,3}$ to the reference signal $V_{RT}$. The ADC 334_1 may gather the sensing result $SR_{1,1}$ and the sensing result $SR_{1,2}$, and accordingly generate the sensing output $SO_1$.

In the second drive cycle, the control circuit 320 may generate the drive signal SD to the control lines $CL_2$ and $CL_3$ so as to enable the sensors $S_{1,2}$ and $S_{1,3}$ to detect the touch event TE. The switch SW2 may couple the sensor $S_{1,2}$ to the input terminal $T_{I2}$ so as to transmit the sensing result $SR_{1,2}$ to the ADC 334_1. The switch SW3 may couple the sensor $S_{1,3}$ to the input terminal $T_{I2}$ so as to transmit the sensing result $SR_{1,3}$ to the ADC 334_1. Similarly, the switch SW3 may couple the sensor $S_{1,3}$ to the reference signal $V_{RT}$ in order to reduce noise interference. The ADC 334_1 may gather the sensing result $SR_{1,2}$ and the sensing result $SR_{1,3}$, and accordingly generate the sensing output $SO_1$.

Based on the above operations, the control circuit 320 equivalently drives 2N control lines in the driving sequence. Hence, the touch sensor array 110 may be regarded as an M×2N touch sensor array, wherein a sensing output generated in response to one drive cycle may come from sensing results of two sensors. In view of this, in a case where the control circuit 320 drives P control lines at a time to alternately enable the N columns of sensors, the touch sensor array 110 may be equivalently expanded to an M-by-(P×N) touch sensor array, wherein a sensing output generated in response to one drive cycle may come from sensing results of P sensors. Thus, the SNR of the touch panel 300 may be greatly increased.

Please note that the above is for illustrative purposes only, and is not meant to be a limitation of the present invention. In an alternative design, at least one of the multiplexer circuits 332_1-332_M shown in FIG. 3 may be implemented by a circuit structure different from the circuit structure shown in FIG. 4. In another alternative design, at least one of the analog-to-digital converters 334_1-334_M shown in FIG. 3 may be implemented by a circuit structure different from the circuit structure shown in FIG. 4. In yet another alternative design, the number of sense lines in each group of sense lines shown in FIG. 3 is not limited to N. For example, at least one of the groups of senses lines $\{SL_1\}$-$\{SL_M\}$ shown in FIG. 1 may be implemented by a single sense line.

To sum up, the proposed touch panel sensing mechanism may simultaneously drive/activate more than one column of sensors within a single drive cycle to thereby equivalently expand a size of a touch sensor array and extend a touch sensing range. Hence, a touch panel utilizing the proposed touch panel sensing mechanism may maintain good SNRs in various operational environments.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a touch sensor array, comprising a plurality of sensors arranged in M rows and N columns, the touch sensor array arranged for detecting a touch event on the touch panel, wherein each of M and N is a positive integer greater than two;
   N control lines, coupled to N columns of sensors respectively; wherein each N control line corresponds to a single column and is directly coupled to the sensors in the corresponding single column;
   M groups of sense lines, wherein each M group comprises a plurality of N sense lines and are coupled to M rows of sensors respectively; wherein each one of the plurality of sense lines in a M group of sense lines is directly connected to only one sensor of a plurality of sensors in a corresponding M row of sensors;
   a control circuit, coupled to the N control lines, the control circuit arranged for alternately driving the N control lines to alternately enable the N columns of sensors to detect the touch event, wherein the control circuit drives P control lines at a time such that P sensors within each of the M rows of sensors are enabled simultaneously, and P is a positive integer greater than one and less than N; and a sensing circuit, coupled to the M groups of sense lines, wherein regarding each of the M rows of sensors, the sensing circuit is arranged for receiving P sensing results generated by the simultaneously enabled P sensors in response to the touch event through a group of sense lines coupled to the row of sensors, and generating a sensing output corresponding to the row of sensors according to the P sensing results.

2. The touch panel of claim 1, wherein the P control lines are adjacent to each other.

3. The touch panel of claim 1, wherein in a first drive cycle, the control circuit simultaneously drives a first control line and (P−1) second control lines included in the N control lines; in a second drive cycle next to the first cycle, the control circuit simultaneously drives the (P−1) second control lines and a third control line included in the N control lines; and the third control line is different from the first control line.

4. The touch panel of claim 1, wherein the sensing circuit comprises:

a processing circuit, arranged for receiving the P sensing results to generate the sensing output; and a selection circuit, coupled between the processing circuit and the M groups of sense lines, the selection circuit arranged for coupling P sense lines coupled to the enabled P sensors to the processing circuit in order to transmit the P sensing results to the processing circuit, and uncoupling sense lines coupled to unenabled sensors from the processing circuit.

5. The touch panel of claim 4, wherein the control circuit generates a drive signal to the P control lines coupled to the enabled P sensors, the selection circuit couples the (N−P) sense lines coupled to the unenabled (N−P) sensors to a reference signal, and the reference signal has a waveform identical to a waveform of the drive signal.

6. The touch panel of claim 1, wherein the sensing circuit sums up the P sensing results and accordingly generates the sensing output.

* * * * *